United States Patent
Ramm et al.

(10) Patent No.: US 10,865,138 B2
(45) Date of Patent: Dec. 15, 2020

(54) INFRARED MIRROR WITH A THERMALLY STABLE LAYER

(71) Applicant: Oerlikon Surface Solutions AG, Pfaffikon, Pfaffikon (CH)

(72) Inventors: Juergen Ramm, Maienfeld (CH); Othmar Zueger, Triesen (LI); Beno Widrig, Bad Ragaz (CH); Helmut Rudigier, Bad Ragaz (CH)

(73) Assignee: OERLIKON SURFACE SOLUTIONS AG, PFÄFFIKON, Pfäffikon (CH)

( * ) Notice: Subject to any disclaimer, the term of this patent is extended or adjusted under 35 U.S.C. 154(b) by 454 days.

(21) Appl. No.: 15/391,951

(22) Filed: Dec. 28, 2016

(65) Prior Publication Data

US 2018/0230042 A1    Aug. 16, 2018

Related U.S. Application Data

(60) Provisional application No. 62/271,485, filed on Dec. 28, 2015.

(51) Int. Cl.
| | |
|---|---|
| *G02B 5/20* | (2006.01) |
| *F21V 9/06* | (2018.01) |
| *C03C 17/36* | (2006.01) |
| *G02B 5/26* | (2006.01) |
| *G02B 5/08* | (2006.01) |
| *F23C 99/00* | (2006.01) |

(Continued)

(52) U.S. Cl.
CPC ........ *C03C 17/366* (2013.01); *C03C 17/3618* (2013.01); *C03C 17/3626* (2013.01); *C03C 17/3644* (2013.01); *C23C 4/11* (2016.01); *F23C 99/00* (2013.01); *G02B 5/0808* (2013.01); *G02B 5/0858* (2013.01); *G02B 5/0875* (2013.01); *G02B 5/208* (2013.01); *G02B 5/26* (2013.01); *G02B 5/282* (2013.01)

(58) Field of Classification Search
CPC . G02B 1/00; G02B 1/10; G02B 1/105; G02B 1/11; G02B 1/111; G02B 1/113; G02B 1/115; G02B 1/116; G02B 5/20; G02B 5/208; G02B 5/22; G02B 5/26; G02B 5/28; G02B 5/281; G02B 5/0875; G02B 5/0808; G02B 5/0858; C23C 17/366; C03C 17/3618; C03C 17/3626; C03C 17/3644; C03C 17/366
See application file for complete search history.

(56) References Cited

U.S. PATENT DOCUMENTS

| | | |
|---|---|---|
| 4,902,081 A | 2/1990 | Huffer |
| 4,996,117 A | 2/1991 | Chu |

(Continued)

FOREIGN PATENT DOCUMENTS

| | | |
|---|---|---|
| DE | 35 43 802 A1 | 6/1987 |
| WO | 2012/019572 A1 | 2/2012 |
| WO | WO 2014/111264 | * 7/2014 |

*Primary Examiner* — Thong Q Nguyen (74) *Attorney, Agent, or Firm* — Pearne & Gordon LLP (57) ABSTRACT

Component surfaces are coated with thermally stable layers. In particular infrared mirror surfaces or surfaces of combustion chambers are coated with at least one layer consisting of thermally stable Al—Cr—O in such a manner that the absorption, reflection or transmission of infrared radiations (hereinafter also called thermal radiations) is influenced.

11 Claims, 12 Drawing Sheets

(51) Int. Cl.
*C23C 4/11* (2016.01)
*G02B 5/28* (2006.01)

(56) References Cited

U.S. PATENT DOCUMENTS

| | | | | |
|---|---|---|---|---|
| 5,563,734 | A | 10/1996 | Wolfe | |
| 6,597,053 | B1 * | 7/2003 | Anthofer | H01L 21/76264 257/508 |
| 7,848,483 | B2 * | 12/2010 | Platonov | B82Y 10/00 378/44 |
| 9,677,169 | B2 * | 6/2017 | Rachbauer | C23C 14/08 |
| 2001/0019048 | A1 * | 9/2001 | Ose | H05B 3/141 219/463.1 |
| 2004/0141578 | A1 * | 7/2004 | Enfinger | G21B 1/03 376/100 |
| 2008/0090099 | A1 * | 4/2008 | Ramm | C23C 14/0021 428/699 |
| 2009/0191417 | A1 * | 7/2009 | Ramm | C23C 14/025 428/457 |
| 2009/0269600 | A1 * | 10/2009 | Ramm | C23C 14/083 428/472.2 |
| 2015/0184290 | A1 * | 7/2015 | Gum | C23C 16/4418 118/728 |
| 2015/0194234 | A1 * | 7/2015 | Shin | H01B 1/08 428/336 |
| 2016/0215632 | A1 * | 7/2016 | Ramm | F01D 5/288 |
| 2018/0195176 | A1 * | 7/2018 | Annen | C23C 28/321 |

\* cited by examiner

INFRARED MIRROR WITH A THERMALLY STABLE LAYER

The present invention relates to the coating of component surfaces with thermally stable layers, in particular to the coating of infrared mirror surfaces or surfaces of combustion chambers, wherein these surfaces are coated with at least one layer consisting of thermally stable Al—Cr—O in such a manner that the absorption, reflection or transmission of infrared radiations (hereinafter also called thermal radiations) is influenced.

In the context of the present invention, the abbreviation "IR" is used for the word "infrared".

The present invention finds application in particular in surfaces of all kinds of combustion chambers, such as those of combustion motors, oil and gas combustion chambers for heating systems, steam and gas turbines, jet engines for rockets and aircraft, but also reactors used for the production of hydrogen by thermal dissociation of water vapor as well as reactor surfaces in the field of nuclear fusion and nuclear fission.

State of the Art

Materials suitable for the manufacture of IR mirrors are those that exhibit a high reflection in the IR wave length range.

Figure 1A:
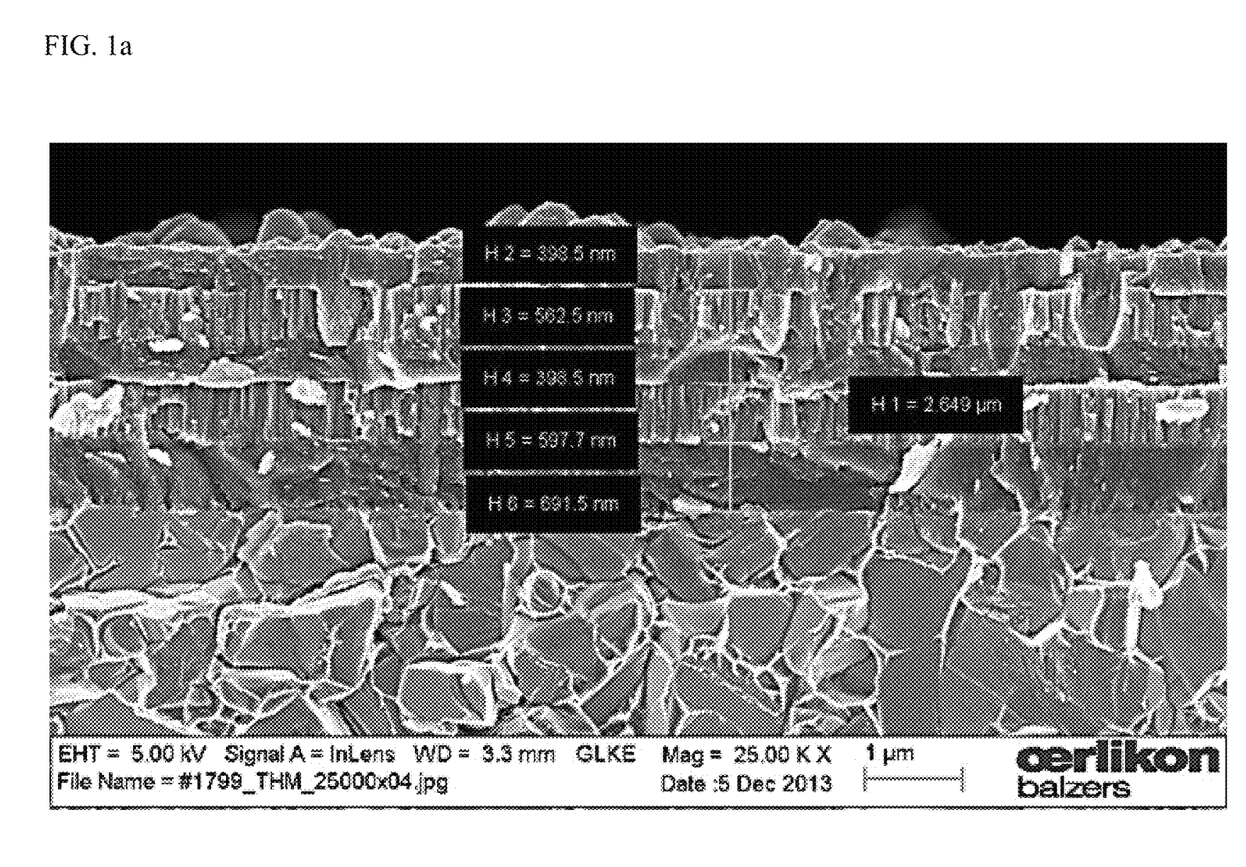
FIG. 1a: SEM fracture cross section of the Al—Cr—O/Zr—O multi-layer structure after coating (layer system A)
Figure 1B:
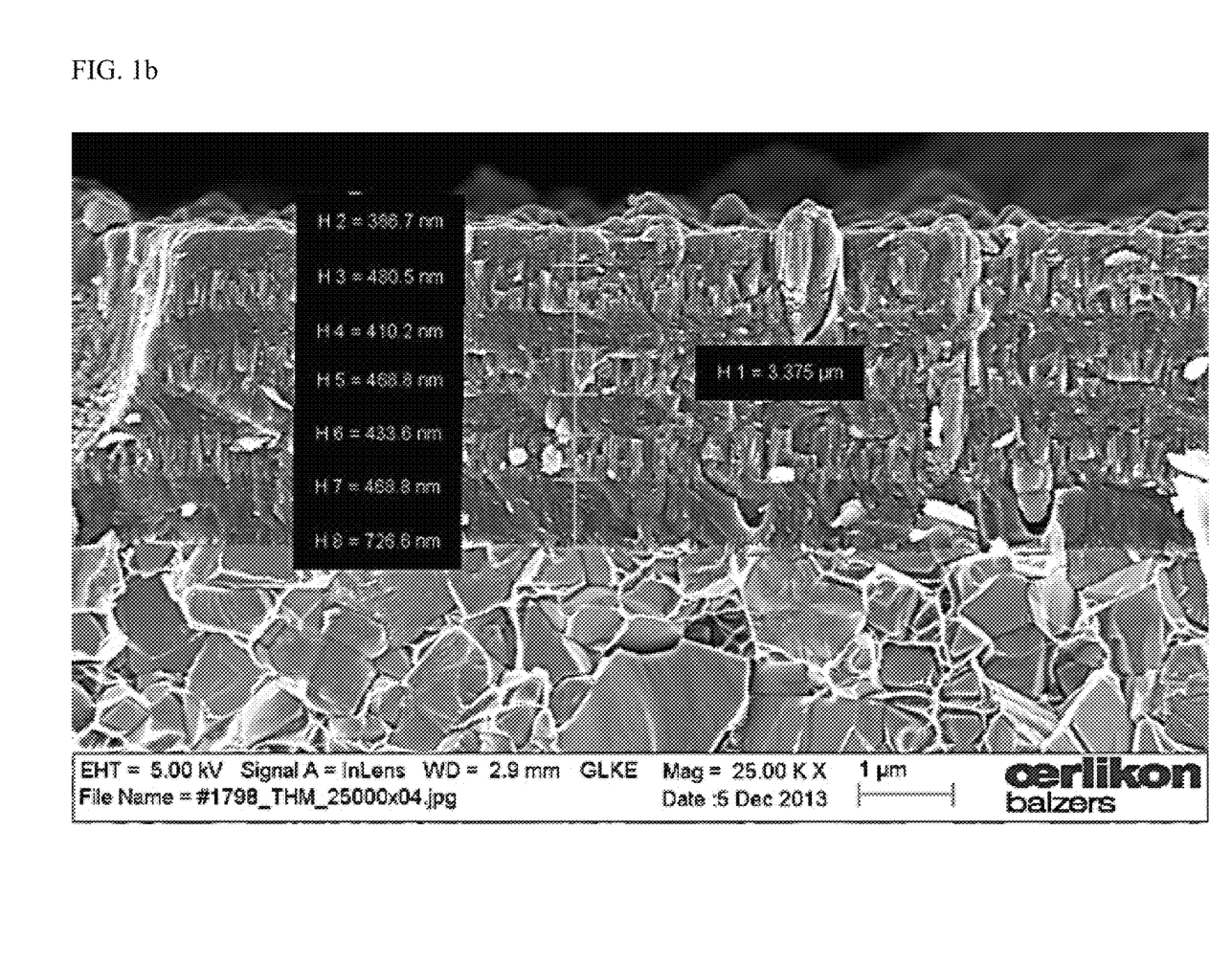
FIG. 1b: SEM fracture cross section of the Al—Cr—O/Cr—O multi-layer structure after coating (layer system B)
Figure 1C:
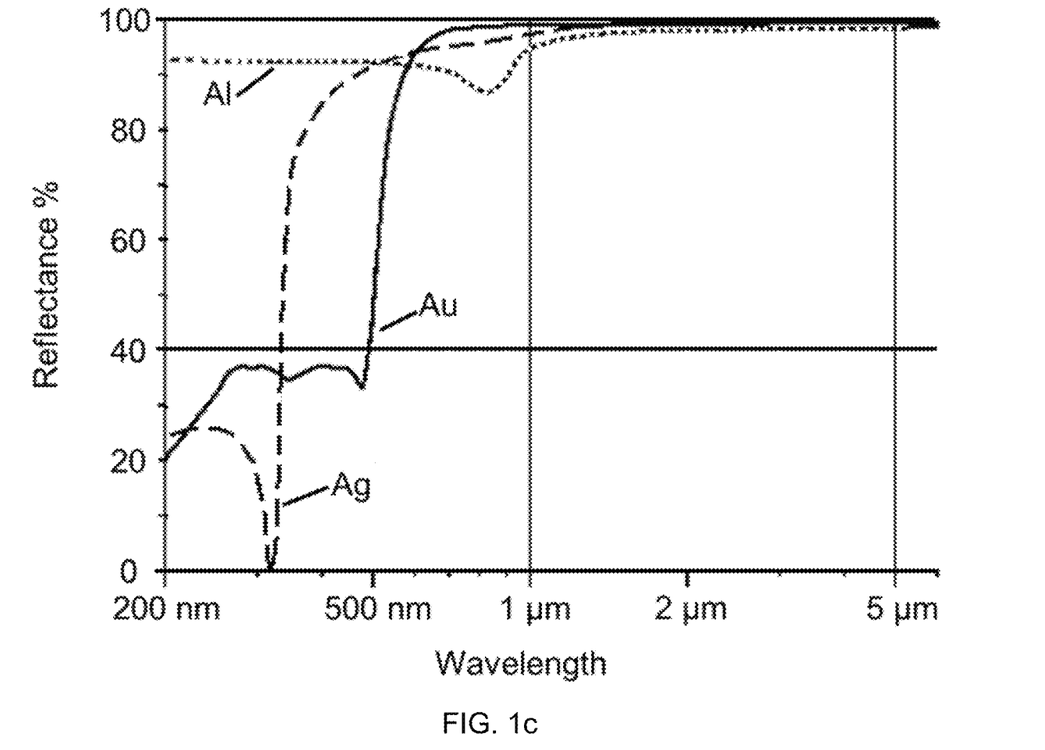
FIG. 1c: Reflection as a function of the wavelength for aluminum (Al), gold (Au) and silver (Ag).

FIG. 1c shows for example the reflection as a function of the wavelength for some such materials, for example aluminum (Al), gold (Au) and silver (Ag). Gold and silver exhibit a particularly high reflection at wavelengths above 1 µm. However, the field of application of layers from these materials is limited by the fact that gold has a low mechanical stability and silver is highly susceptible to oxidation. This problem is exacerbated at increased temperatures. It is therefore not possible for example to use these materials at temperatures above 600° C. or even above 800° C. In addition to the purely metallic materials such as Al, Cu, Ag and Au (aluminum, copper, silver and gold), some other materials are also suitable for IR mirrors. Particularly noteworthy in this connection is TiN. This material can be produced without problem by means of PVD coating technology in the form of thin layers on nearly any kind of substrate sizes and is thus advantageously suitable for modifying base materials. Additionally, this material has a greater hardness and resistance to wear and tear than the above mentioned metals.

In the case where IR mirrors are to be used at high temperatures, for example above 600° C., in atmosphere, two problems often arise.

The first relates, as already mentioned here above, to the insufficient mechanical stability, which can be observed in the case of IR mirrors made of certain metals such as for example gold. These metals become soft at such high temperatures and can thus limit the range of application of the IR mirror, since for example the resistance to wear and tear is reduced.

The second problem relates to the poor resistance to oxidation, which can also be observed in the case of IR mirrors of certain metals, which results in the optical properties of the IR mirror becoming drastically altered. Furthermore, the absorption for IR radiation can increase with the formation of oxide surfaces, which further accelerates the heating and thus the degradation.

This applies in particular to IR mirrors that are produced as layer systems, consisting of thin layers, since in such cases even a small diffusion of oxygen can result in a widespread oxide formation through the entire layer thickness of the layer system.

When using systems made of thin layers in such applications, the problems mentioned previously can be partly solved if such a thin layer with infrared reflecting properties is embedded between thermally more stable layers, for example of nitrides or oxides.

Hereinafter, some examples for the applications of IR mirrors will be mentioned.

In the case of glass cladding of buildings, it is desirable for the cladding to be translucent in the visible wavelength range but not to let through light in the IR wavelength, in order to reduce the costs for air-conditioning the rooms. A simple semi-transparent metallic coating serving as IR mirror would be a solution, but is not desirable and in many cases not permitted in such architecture application because of the impact it causes on the other surroundings due to the reflective heat radiation. However, systems of thin layers can be designed in such a manner that they serve as optical filters and drastically reduce the transmission of IR radiation, yet simultaneously achieve the "low emissivity" required for environmental considerations, i.e. reduce the reflection in the IR range. The principle of such filters is that the substrate (i.e. the glass) absorbs heat and converts it for radiation in another harmless wavelength.

U.S. Pat. No. 4,902,081 describes such a "low emissivity" thin layer system consisting of both silver (Ag) and titanium nitride (TiN) layers, in order to reflect long and short wave heat radiation. Whilst the Ag is embedded in oxide layers, the TiN is used as top layer of the layer system. The layer system (by means of the wavelength conversion function) must be stable for temperatures up to approx. 80° C. (180° F.). Whilst Ag requires for this to be embedded in the oxide layers, the TiN layer is stable at these temperatures in normal atmosphere and requires no protective layer against oxidation.

U.S. Pat. No. 5,563,734 describes another example of a "low emissivity" thin layer system in which Ag is used as layer for IR reflection. The Ag layer in this example is not directly embedded in oxidation layers resp. in this case in titan dioxide ($TiO_2$) layers, but another layer of Ni—CrNx is deposited between the oxide and the Ag (resp. between the oxide layer and the Ag layer). In this manner, an oxidation of the Ag (resp. of the Ag layer) is to be prevented, in that the Ag does not adjoin an oxygen-containing layer and is thus not oxidized while the thin layer system is produced nor during operation.

These aforementioned examples make clear that an oxidation of the mirror material is to be prevented in the case of metallic IR mirrors. From this it must be also concluded that this problem will be even more exacerbated at higher temperatures and thus either layer materials need to be found that are more stable in respect of oxidation or the thin layer systems must be designed in such a way that an oxygen diffusion to the IR mirror layer itself can be prevented. Such a material is for example TiN, which has not only more advantageous mechanical properties but is also more resistant to oxidation. This material can thus be used for applications at temperatures up to approx. 500° C. However, such an operating temperature of 500° C. or less is still not sufficient in many cases for the uses of IR mirrors aimed for here.

The thermal instability of the IR mirrors and associated layer systems known so far from the state of the art currently prevents new possible applications of IR mirrors.

Although there are some applications that use pure polished metallic surfaces as mirror (e.g. gas radiant heaters), these applications are such that a degradation of the IR mirror effect will compromise the main effect through the formation of oxides on the metal surface, but such a reduction in quality can be accepted since the decrease in efficiency is tolerated but also because the degradation does not result in the destruction of the entire system, for example through overheating.

This is however different for applications in which a material at the limits of thermal stability is used and in which a degradation of the IR optical properties will cause a risk of the material becoming unstable and that it could result in a failure of the system to be protected or of the component to be protected.

WO2012019572A1 describes a burner in which the combustion chamber is constituted of temperature-stable nickel chromium iron (Ni—Cr—Fe) alloys. During combustion, the combustion chamber is exposed to an oxidative corrosive environment at temperatures of 1200 to 1500° C. In order to reduce the corrosive and oxidative wear and tear, layers are proposed that serve as thermal barrier layers and diffusion barriers and that are applied by means of plasma spraying on the critical areas of the combustion chamber. This document discloses that for this application, both a thermal barrier, here of zirconium dioxide ($ZrO_2$) as well as an oxygen diffusion barrier layer are required in order to solve the complex problem, i.e. in order on the one hand to reduce the temperature at the surface of the Ni—Cr—Fe alloy by means of the $ZrO_2$ thermal barrier layer and on the other hand to reduce resp. prevent the oxygen diffusion with a further layer in the interface between the alloy and the thermal barrier layer. The thermal barrier layer is applied through plasma spraying, which in view of the current state of the art means that it is a couple of 100 μm thick.

The solution of a related problem by means of a protective layer is described in DE3543802A1, which protects components in hot gas turbines and jet engines against hot gas corrosion, wherein the layers act against the corrosive behavior as well as reduce the temperature on the surface of the components. These layers are applied by means of flame or plasma spraying onto the components.

BRIEF SUMMARY

The present invention aims to provide temperature-stable infrared mirrors that can allow new application possibilities, in particular at high temperatures for example above 600° C. or even above 1000° C.

In particular, it is an object of the present invention to provide an IR mirror surface that can be used for special functions in the field of heat radiation, wherein this surface is resistant against a degradation by high temperatures and, in this manner, can ensure stable optical properties in the infrared (IR) wavelength range (wavelengths between 1 and 20 μm) at high temperatures.

The aim of the present invention is achieved in that the surfaces that are to be used as IR mirror are coated with a single layer or with a multi-layer system, wherein the single layer or at least one of the layers in the multi-layer system consists of temperature-stable aluminum chromium oxide (Al—Cr—O). The surfaces thus coated can be transparent, insulating or also metallic. The coating of the surfaces is achieved preferably by means of the PVD process, even more preferably by means of reactive cathodic arc evaporation or by means of sputter coating methods.

In such applications, stable infrared mirrors could replace the thermal barrier layer, provided that the stability of such a mirror were provided also at such high temperatures and in an oxidizing environment. There would thus be a whole range of potential application possibilities for the use of IR mirrors that are however not feasible because there are currently no stable IR mirrors in the temperature range above 600° C. or even above 1000° C. For one class of such applications, it is desirable that the heat radiation be prevented from penetrating into a material surface, for example when a compact material is not to be heated up (in case it absorbs in the IR) or when the transmission of the IR radiation through the compact material (in case it is IR transparent) is to be reduced. This is especially the case for applications where material surfaces surround a space in which heat energy is generated at high temperatures and that is to be protected from energy loss. These include all kinds of combustion chambers such as those of combustion motors, oil and gas combustion chambers for heating systems, steam and gas turbines, jet engines for rockets and aircraft, but also reactors used for the production of hydrogen by thermal dissociation of water vapor as well as reactor surfaces in the field of nuclear fusion and nuclear fission. In all these cases, it would be desirable for the surfaces resp. their parts exposed to the high temperatures to be protected. This protection should pertain both to the heating of the compact material but simultaneously also to the chemical stability of the relevant surface, i.e. especially prevent resp. at least strongly reduce diffusion processes and oxidation. Other applications are also conceivable in relation to the manufacture of semi-conductors, in which IR radiation heaters are used for quickly heating the wafer for cleaning and coating processes but in which certain parts of the coating chamber have to be protected from high temperature.

According to the present invention, the thermal and chemical stabilization of an IR mirror is achieved through a thin layer of Al—Cr—O, which prevents the oxidation of the IR mirror at its surface as well as provides sufficient mechanical stability in order to protect the surface of the IR mirror against mechanical stress and wear and tear.

This layer should merely serve as protection layer and thus influence the optical properties of the IR mirror in the wavelength range greater than 1000 nm (i.e. in the range of the heat radiation) only negligibly or little.

As already mentioned above, this layer is to be applied as thin layer on substrate surfaces, preferably by means of a PVD process, even more preferably by means of reactive cathodic arc evaporation or by means of sputter coating methods.

According to a preferred embodiment of the present invention, the IR mirror is designed on the basis of a TiN layer that is stable in terms of its properties in the IR range at high temperatures and in normal or reactive gas environments.

By means of the present invention, the protection of metallic surfaces that act as IR mirror can be ensured.

By means of the present invention, the reflection in the IR wavelength range can be increased on surfaces of super-alloys (for example super-alloys based on nickel such as Inconel), intermetallic compounds and aluminides.

By means of the present invention, the reflection in the IR wavelength range can be increased on surfaces of compact materials based on Si—C and Si—N.

By means of the present invention, layer systems such as filters and the like, which are used in the field of heat radiation, can be designed in such a way that they maintain their stability also at high temperatures.

MORE DETAILED DESCRIPTION OF THE INVENTION ON THE BASIS OF EXAMPLES

Hereinafter, assays are mentioned and discussed which serve as the basis for the invention and for understanding it

As already mentioned above, the application of the inventive layer relates to the field of heat radiation and serves to protect from degradation surfaces and layer systems designed for such applications. Thus, one necessary prerequisite for such a layer is the thermal stability with respect to the optical properties in the infrared range. In this connection, it is necessary to distinguish whether the layer is used actively, for example in a filter design, or merely serves to provide protection for a filter or mirror with respect to oxidation and chemical stability. In the latter case, a small spectral shift in the reflection behavior is entirely tolerable. The layers examined here were deposited on steel substrates or hard metal substrates in view of one of the intended fields of application for IR mirrors of metallic surfaces. However, in the same process, the same layers were also deposited on insulating materials such as for example aluminum oxide, AlN or SiN or also on semi-conductor materials such as Si and SiC. To investigate the thermal stability, it is here especially the metallic substrates that will be discussed since the latter are particularly challenging for applications at high temperatures due to the general propensity for oxidation.

In FIGS. 1a to b, the fracture cross sections of two layer systems are indicated. FIG. 1a shows a layer system consisting of (Cr—N)/692 nm Al—Cr—O/598 nm Zr—O/399 nm Al—Cr—O/563 nm Zr—O/399 nm Al—Cr—O (layer system A), which was deposited on a hard metal substrate.

The fracture cross section clearly shows differences in the layer morphology between the Al—Cr—O layer (dense) and the Zr—O layer (columnar). Additionally, one will notice the many layer errors that arise through the partly metallic splatters occurring during arc evaporation and which are typical in many cases for this evaporation method. Therefore, the use of such a layer for optical application in the visual field would be scarcely desirable for the one skilled in the art because on the one hand the metallic splatters influence the optical properties (increased absorption) and on the other hand there would be a risk of a continuous oxidation of these splatters. This assessment is however based on the experiences in the visible wavelength range. The uses of such layers in the IR range, however, showed very encouraging results. This can probably be attributed to the fact that in an oxidizing environment, the splatters, which in arc evaporation are mainly of a metallic nature, through subsequent post-oxidation by means of volume increase close gaps and thus stabilize the layer and the latter's properties. It must be mentioned that the Zr—O chosen in this layer system was not stabilized by Y, i.e. in the case of oxygen diffusion and increased temperature, the Zr—O would undergo a phase transformation. It must be mentioned that this would place an additional high demand on a protection layer.

FIG. 1b shows the SEM fracture cross section of a further layer system. The substrate is again a hard metal substrate and the layer system deposited thereon consists of (Cr—N)/727 nm Al—Cr—O/469 nm Cr—O/434 nm Al—Cr—O/469 nm Cr—O/410 nm Al—Cr—O/481 nm Cr—O/387 nm Al—Cr—O (layer system B). Here, too, clear differences concerning the layer morphology can be observed. Furthermore, the incorporation of spatters in the layer system is again clearly visible. The layer growth on these spatters results in distinctive grain boundaries that can extend over several individual layers. On the left side of the picture there is also a burst of a big splatter, originating from the arc evaporation coating process. In the present layer system, the Al—Cr—O layer was deposited in alternation with a Cr—O layer, the coating of which however took place in a deficient oxygen flow with respect to the formation of a stoichiometric Cr2O3. This oxygen flow was chosen deliberately so as to be better able to test the layer system against instability, since an oxygen transport would result in a subsequent oxidation at 500° C. and in the normal environment of the sub-stoichiometric Cr2O3.

Figure 2A:
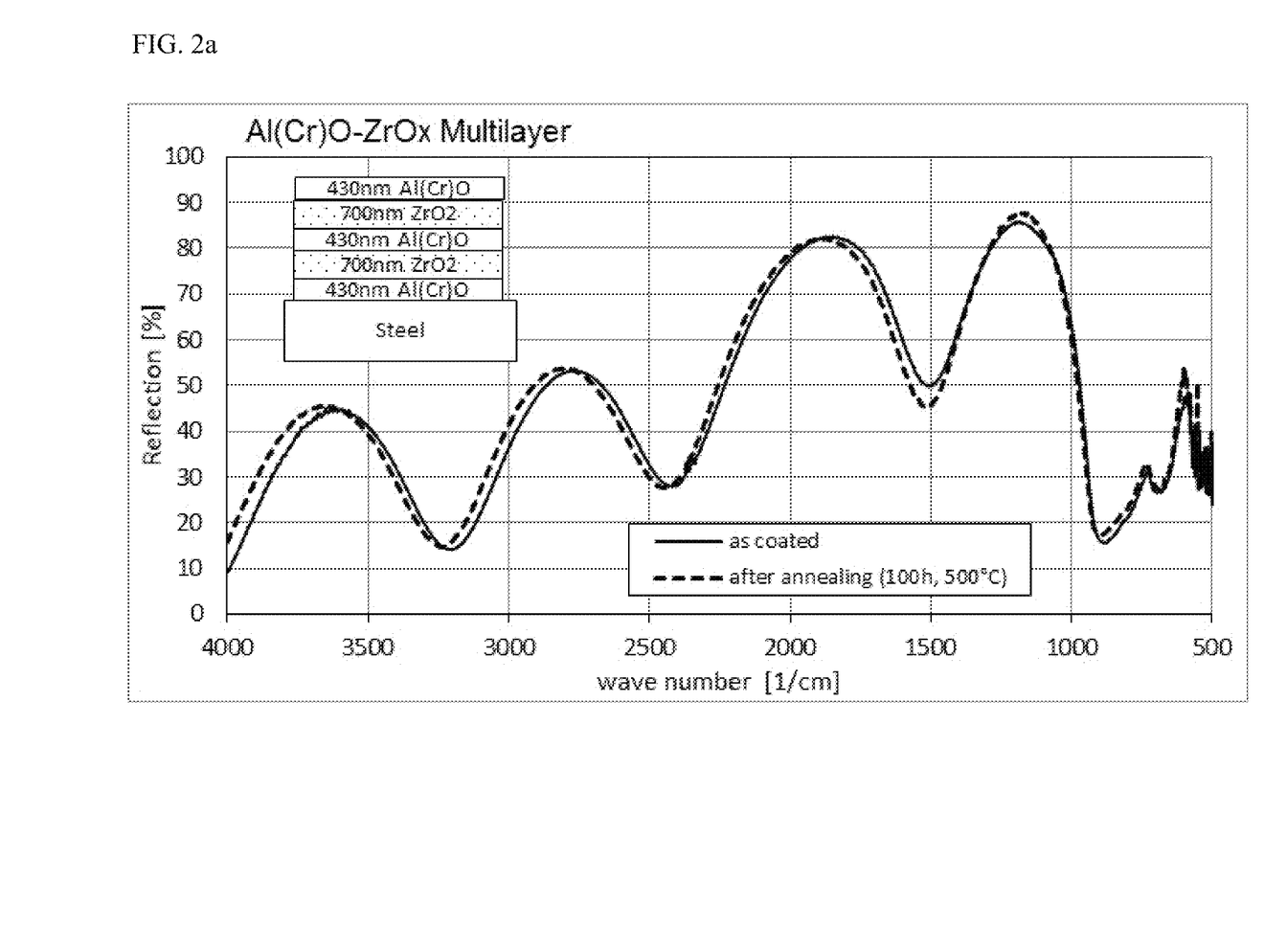
FIG. 2a: Comparison of the IR reflection of the layer system A as a function of the wave number after the coating (solid line) and after an annealing step of 100 h at 500° C. in normal atmosphere (dotted line)
Figure 2B:
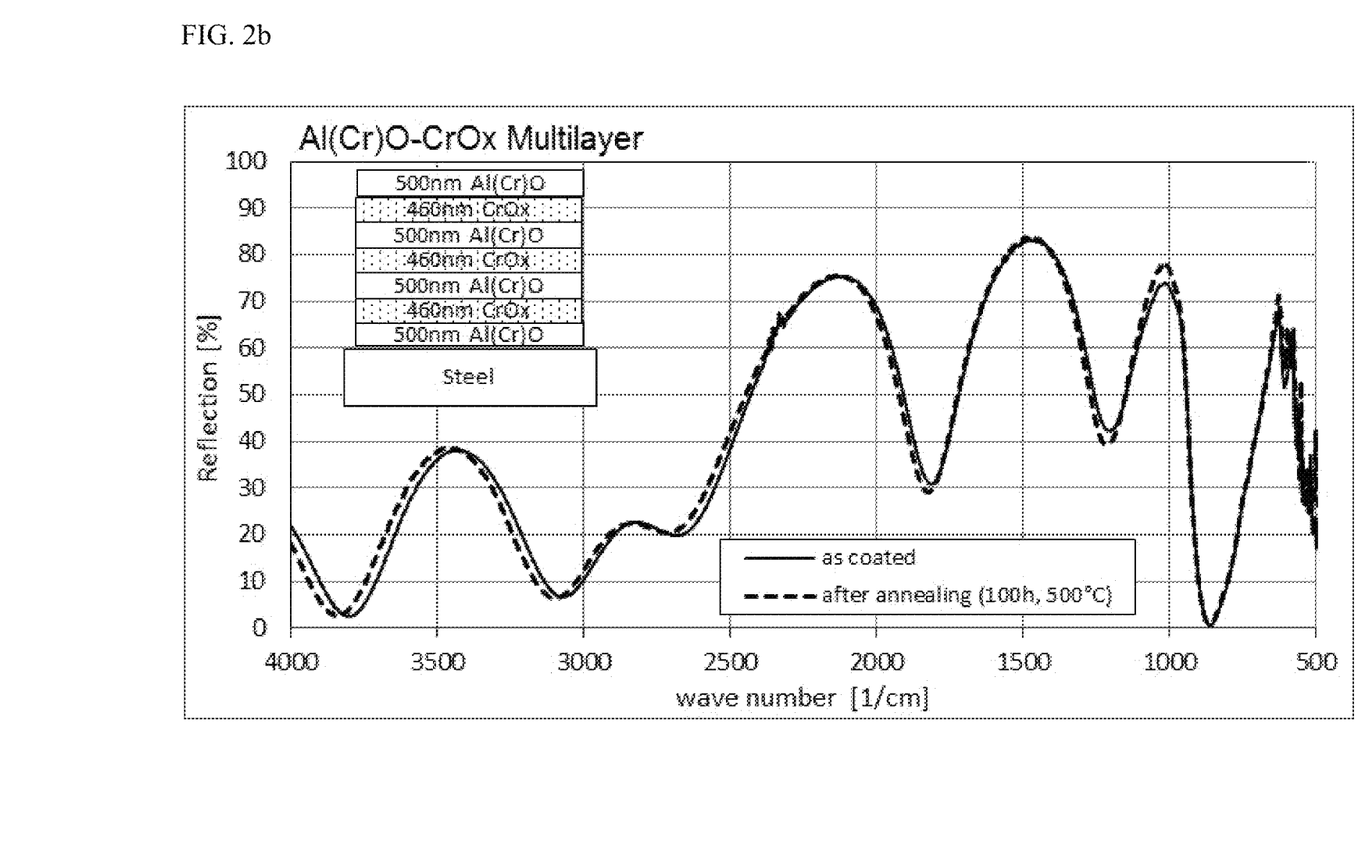
FIG. 2b: Comparison of the IR reflection of the layer system B as a function of the wave number after the coating (solid line) and after an annealing step of 100 h at 500° C. in normal atmosphere (dotted line)

In a first series of experiments, these layer systems were investigated as to their stability in the IR wavelength range. FIGS. 2a and b show the reflections of the layer systems A and B deposited on the steel substrate in the IR range. The curves were all measured at room temperature. The solid line shows the reflection as a function of the wave number for the layers in the post-coating state. The dotted line shows the reflection as a function of the wave number for the same layers which were subjected to an additional annealing process for 100 h at 500° C. in ambient atmosphere. For all of the layers, an excellent stability of IR spectra is observed. A minimal reduction of the refraction index to shorter wavelengths (i.e. with wavelength=1/wavelength to higher wave number values) in near and middle IR (wavelengths smaller than 5 μm or wave number greater than 2000 cm$^{-1}$) is an indication of a slight spectral shift of the optical absorption edge to smaller wavelengths, which is usually observed in oxygen containing atmosphere deposited layers after annealing steps and which can be attributed to the full oxidation of sub-stoichiometric constituents in the grown layer. The thermal stability of the layer is remarkable, especially in view of the morphological characteristics discussed above, such as exemplified by the spatters and the growth of the layer on spatters with the grain boundary formation.

The IR spectrum of the layer system B, shown in FIG. 2b, also exhibits great stability. Here too a spectrum was measured that exhibits only a small spectral shift to shorter wavelengths, thus pointing also to a slight spectral shift of the absorption edge towards smaller wave length or larger wave numbers.

It is possible to conclude from the two measurements that an Al—Cr—O layer in combination with another thin layer is very well suited to stabilize optical systems in the field of heat radiation.

In the explanations above, the stabilizing effect of the Al—Cr—O layers on thin layer systems has been documented, in case these are used as covering layers. The layer systems consisted of oxides of different materials and they also differed as to their state of oxidation. These recognized properties of the Al—Cr—O layers are necessary prerequisites for their use also as a cover layer for metallic surfaces, i.e. for the protection of IR mirrors. This includes all applications in which the surfaces of metals and other, non-oxide materials have to be protected against oxidation in order to preserve the IR optical properties of the surfaces. To this end, it is essential that the Al—Cr—O layer is designed thin enough to protect the surface against oxidation, but at the same time without the layer influencing, or only negligibly influencing, the optical properties of the mirror characteristics in IR. Typical wavelengths of IR radiation are for example between 1000 nm and 10000 nm. The Al—Cr—O layers must be thinner than the typical wavelengths of the IR radiation, preferably considerably thinner, for example the layer thickness of an Al—Cr—O layer according to the present invention can be in a range of less than 200 nm, so that in the relevant close and middle infrared range only marginally wave-optical interferences occur, or in the case of greater layer thicknesses the interference minima in the reflection behavior end up being in wavelength ranges offside from the intensity maximum of the infrared radiation source. This requirement results from the broadband capacity of the relevant IR light in applications: with a thermal radiation source with a surface temperature of 2000° C., the majority (80%) of the IR light in the wavelength range from 1000 . . . 5000 nm (10'000 . . . 2000 cm$^{-1}$) is emitted, i.e. the relevant wavelength range extends over a range in which the wavelength changes by a factor of 5 or more. If the reflection is then maximized by means of thin layer interferences with a dielectric layer with n=2 at a wavelength of e.g. 2500 nm (4000 cm$^{-1}$), this would result in reflection minima at approx. 1700 nm (6000 cm$^{-1}$) and approx. 4000 nm (2500 cm$^{-1}$), i.e. within the relevant wavelength range, thus resulting in no gain of reflected IR radiation averaged over the range from 1000 . . . 5000 nm (10'000 . . . 2000 cm$^{-1}$). In other words, the oxide layer (whereby the AlCr—O layer is meant) should be so thin that as few wave-optical interference minima as possible occur in the reflection behavior, but thick enough that a good protection against oxidation can be ensured. For example, in the case of infrared radiation starting from a source with a temperature of 2000° C., this layer should have a thickness of a couple of hundred nm, preferably below 500 nm, even more preferably below 200 nm.

The transmissivity of the Al—Cr—O in the relevant IR range must be as high as possible. The IR radiation must pass through this Al—Cr—O layer insignificantly weakened, in order to be reflected at the mirror layer and subsequently be transmitted back through the Al—Cr—O layer with minimal reflection loss.

In order to illustrate the problem and its solution, assays were conducted on an uncoated TiN layer and the results were compared with a TiN layer coated with Al—Cr—O according to the invention.

Figure 3:
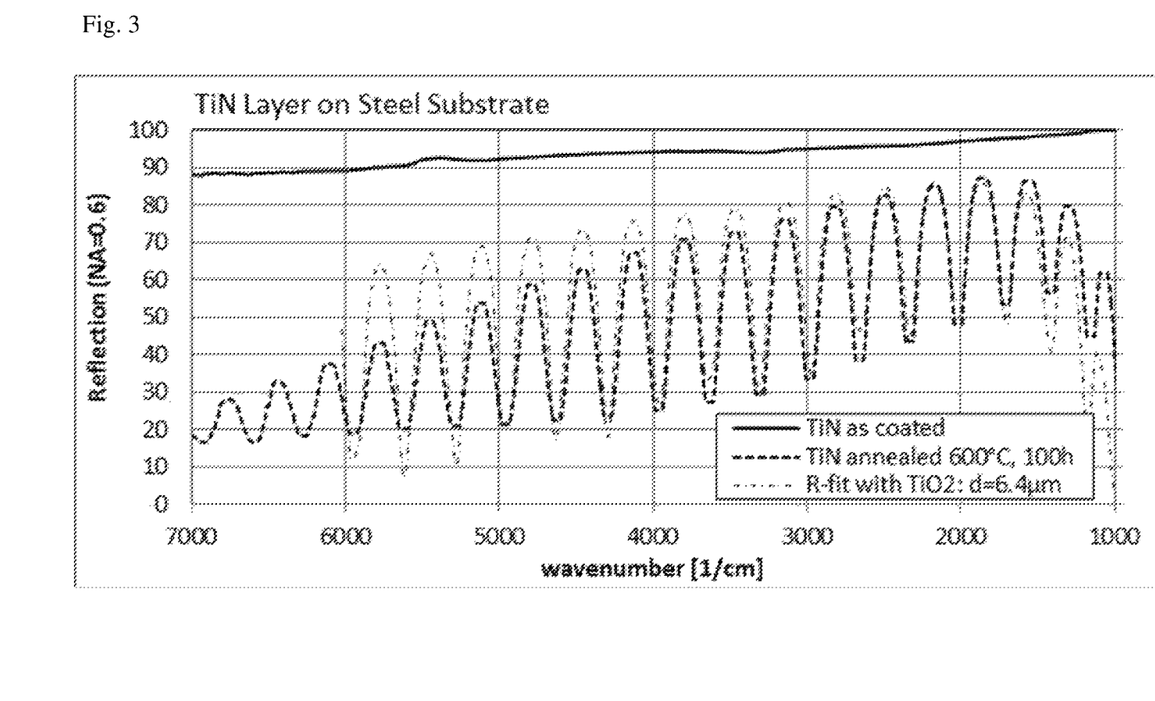
FIG. 3: Comparison of the IR reflection of a TiN layer after coating without further treatment (solid line) and after an annealing step of 100 h at 600° C. in normal atmosphere (thick dotted line). The curve measured after this annealing step can be fitted very well with a TiO$_2$ layer with a thickness of 6.4 µm and a refractive index of n=2.2 at 2500 cm$^{-1}$, which is typical for this material in the range 4000 nm (2500 cm$^{-1}$) (thin dotted line).

FIG. 3 shows the IR reflection of a TiN layer. The TiN layer was produced at approx. 500° C. in a vacuum coating system by means of cathodic arc evaporation of a Ti target in nitrogen containing atmosphere. Subsequently, the IR reflection in this layer was measured at room temperature (solid line). The measurement shows the excellent reflecting properties of TiN in the IR range and thus constitutes a promising material for such applications. Additionally, there are the known good mechanical and chemical properties of TiN, which distinguish this material also from classical IR mirror materials such as Cu, Al and Ag. However, if this TiN layer is exposed to an annealing step at 600° C. for 100 h under normal ambient conditions, the reflection behavior changes drastically (dotted line). After the annealing step, a spectral pattern is observed that is typical for optical interference layers.

This pattern is to be attributed to a complete oxidation of the TiN layer to $TiO_2$. In a comparison with an interference-optical single layer on a steel surface (thin dotted line), the pattern can be reproduced by a layer with a refractive index n of approx. n=2.2 at a wave number of 2500 cm$^{-1}$, which corresponds to the generally known value of n for pure $TiO_2$ layers. The thickness of the $TiO_2$ layer derived from the analysis of the pattern is 6.4 μm and corresponds to a value that is to be expected for a layer initially deposited as TiN with a thickness of approx. 5.5 μm and then oxidized to $TiO_2$. The spectral oscillation amplitude for an ideal $TiO_2$ layer should increase with increasing wave number (i.e. smaller wavelength), however in FIG. 3 a reduction is observed. This behavior can be explained by a layer roughness on the order of 0.1 μm and some residual absorption loss at larger wave number.

It has now been tested whether an Al—Cr—O layer can protect this TiN so well that no titanium oxide is formed in a TiN layer covered with an Al—Cr—O layer, i.e. the Al—Cr—O layer can serve as a impermeable oxidation barrier. In a subsequent coating step, already TiN coated steel substrates were overcoated with an approx. 4 μm thick Al—Cr—O layer by means of cathodic arc evaporation.

Figure 4:
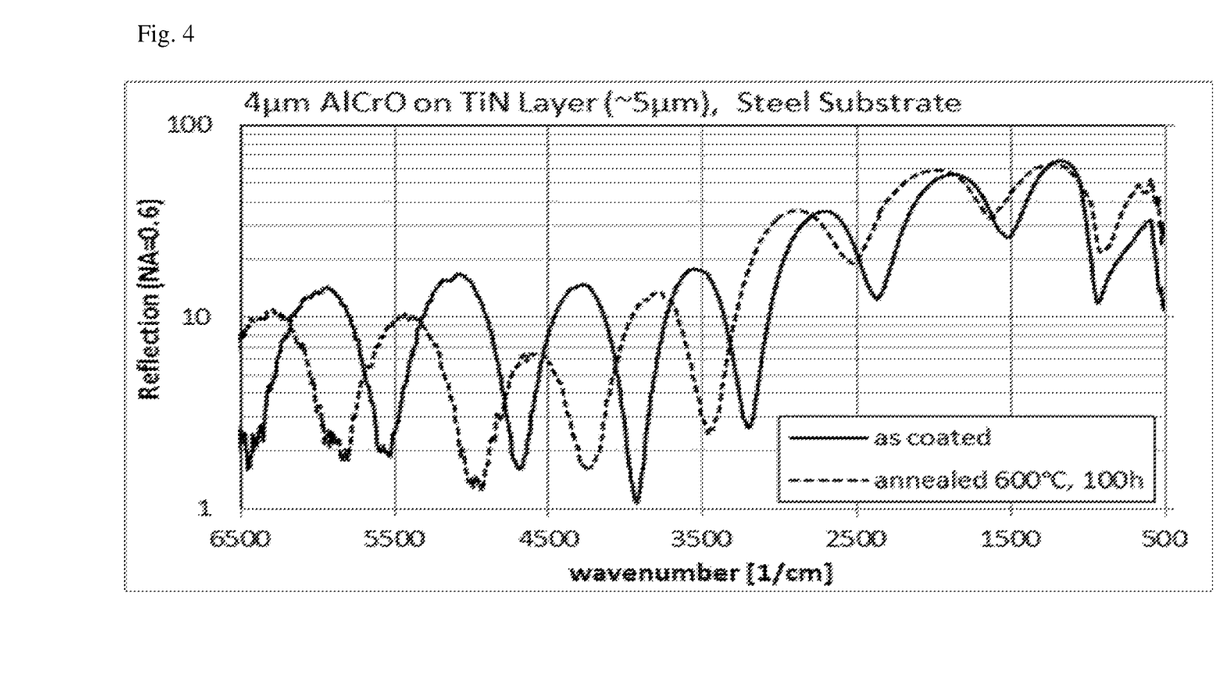
FIG. 4: Comparison of the IR reflection of a TiN layer coated with Al—Cr—O prior to (solid line) and after (dotted line) an annealing step of 100 h at 600° C. in normal atmosphere

The measurement results of the IR reflection on this substrate are represented in FIG. 4. The reflection spectrum shows both before as well as after the annealing step of 600° C. during 100 h a characteristic minima-maxima structure that arises from the interference of the IR light in the Al—Cr—O on the highly-reflecting TiN layer. The drop in reflection at higher wave numbers (shorter wavelengths) results from the transmissivity losses in the Al—Cr—O layer due to residual absorptions in the layer. In contrast to the unprotected TiN layer, no sign is visible of a transformation of TiN to $TiO_2$ in the spectral characteristic of the reflection behavior. If a similar oxidation of the TiN layer had taken place, an oscillation of the reflection with a comparable period as in FIG. 3 would be overlaid on the reflection spectrum of the Al—Cr—O layer on the TiN layer as in FIG. 4.

As already in the previously described layer systems A and B in FIGS. 2a and b, a shift of the spectral pattern towards larger wave numbers is again observed. From the modulation amplitude of the spectral oscillations, the refractive index n of the Al—Cr—O layer can be estimated to be approx. 1.7 at 5000 nm (2000 $cm^{-1}$). In a similar manner, a refractive index of approx. 1.6 can be extracted from a spectral analysis after the annealing step. From the spectral shift towards larger wave numbers (smaller wavelengths), a small change of the refractive index of the Al—Cr—O layer by approx. −0.1 can be observed. This change can be attributed to stabilization of the Al—Cr—O layer or of the interface between Al—Cr—O and underlying TiN layer. This stabilization is not a process that could be explained by means of an oxide formation of the TiN at the interface of the Al—Cr—O layer to be coated, since an oxidic Ti layer or interface to TiN would have a higher refractive index than Al—Cr—O and would result in a spectral shift towards smaller wave number.

The investigations so far prove that Al—Cr—O layers are very suitable for stabilizing optical systems if they are used as cover coating, in order to prevent the oxidation of the underlying layer system or of the underlying surface. In this respect, the layer is suitable both in layer systems and as single layer on surfaces whose IR optical properties are to be stabilized against oxidizing processes. The use of Al—Cr—O in IR mirror coatings are of special interest, since they have a great application potential for influencing the transmission of heat in energy-converting systems and could thus be used essentially to increase the degree of efficiency of such systems. Whilst use in IR optical systems, such as is for example the case in filters, requires a certain thickness of the Al—Cr—O layer, the Al—Cr—O layer in an IR mirror coatings should prevent the oxidation of the IR mirror layer yet simultaneously affecting the IR reflection of the mirror as little as possible.

Figure 5A:
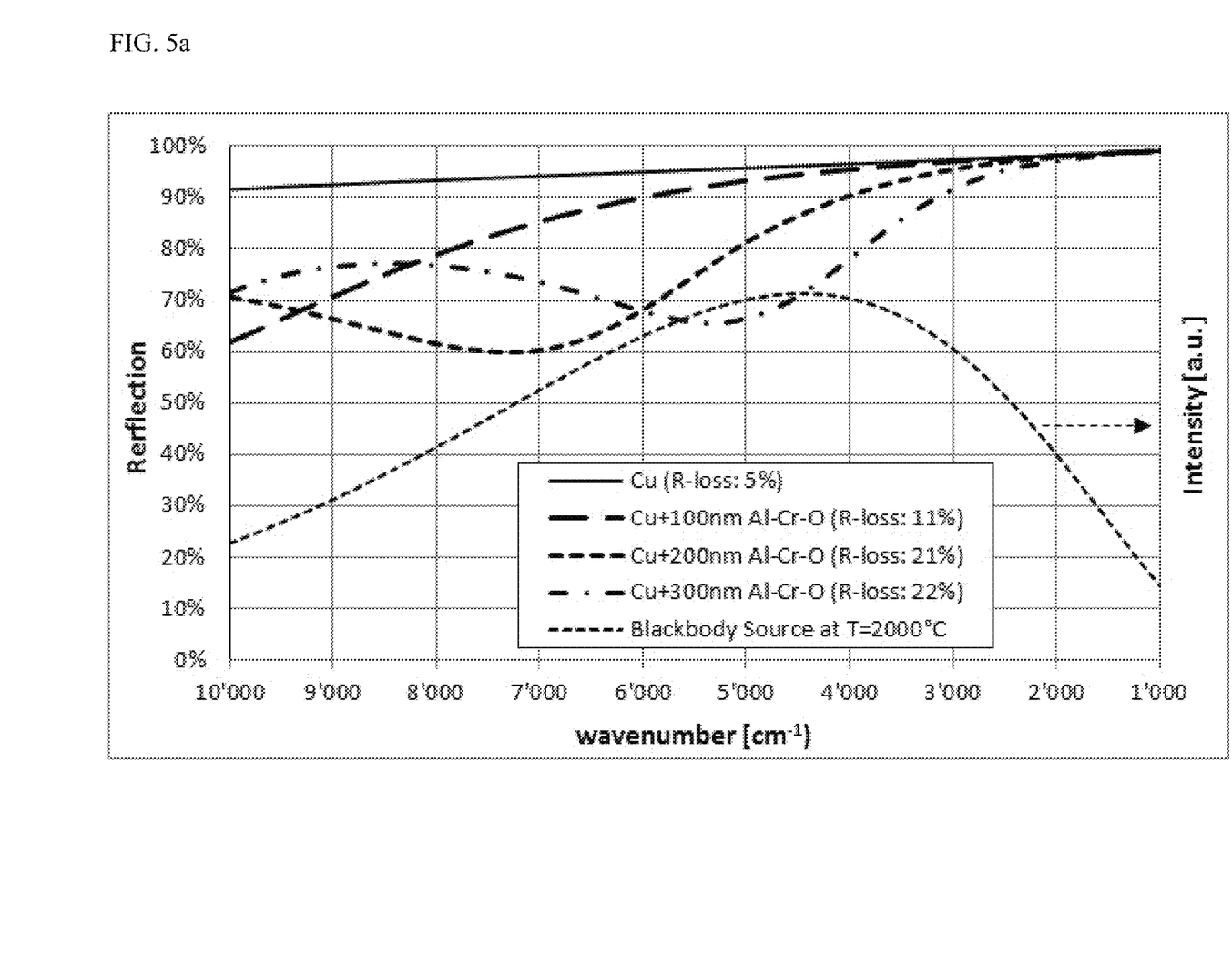
FIG. 5a: Reflection spectrum (simulated) of a Cu surface without and with Al—Cr—O layers of 100 nm, 200 nm and 300 nm as oxidation barriers. The reflection loss (R-loss) value indicates the relative loss of radiation during reflection of the IR radiation from a Planck blackbody source with 2000° C.
Figure 5B:
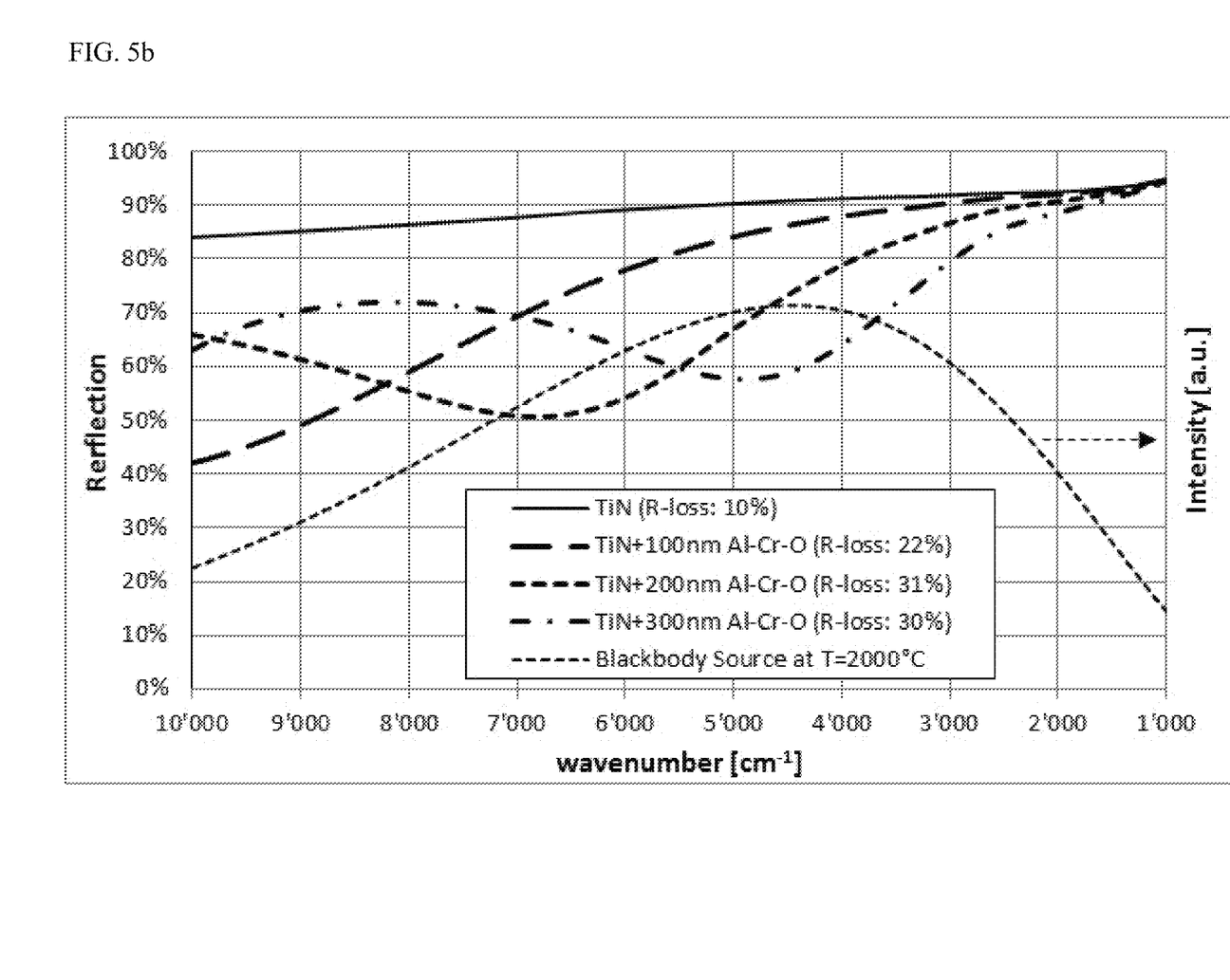
FIG. 5b: Reflection spectrum (simulated) of a TiN layer without and with Al—Cr—O layers of 100 nm, 200 nm and 300 nm as oxidation barrier. The reflection loss (R-loss) value indicates the relative loss of radiation during reflection of the IR radiation from a Planck blackbody source with 2000° C.

FIGS. 5a and 5b shows calculated IR reflection spectra of a Cu and of a TiN surface and the IR reflection spectra that would result if these surfaces were coated with Al—Cr—O layers of different thicknesses. Also included is the calculated relative loss for the reflection of the IR radiation of a Planck blackbody source with T=2000° C. As the thickness of the Al—Cr—O protective layer increases, the reflection decreases. From this representation it appears that the Al—Cr—O layer must be kept as thin as possible in order to achieve good radiation reflection performance for the mirror application. Thus, the thickness to be chosen is a compromise between as good as possible radiation reflection properties and as good as possible oxidation barrier function, wherein the role as protective layer against mechanical influences, e.g. particles in the hot gas flow of a combustion chamber, can additionally be relevant as a further criterion for the choice of the layer thickness.

Figure 6:
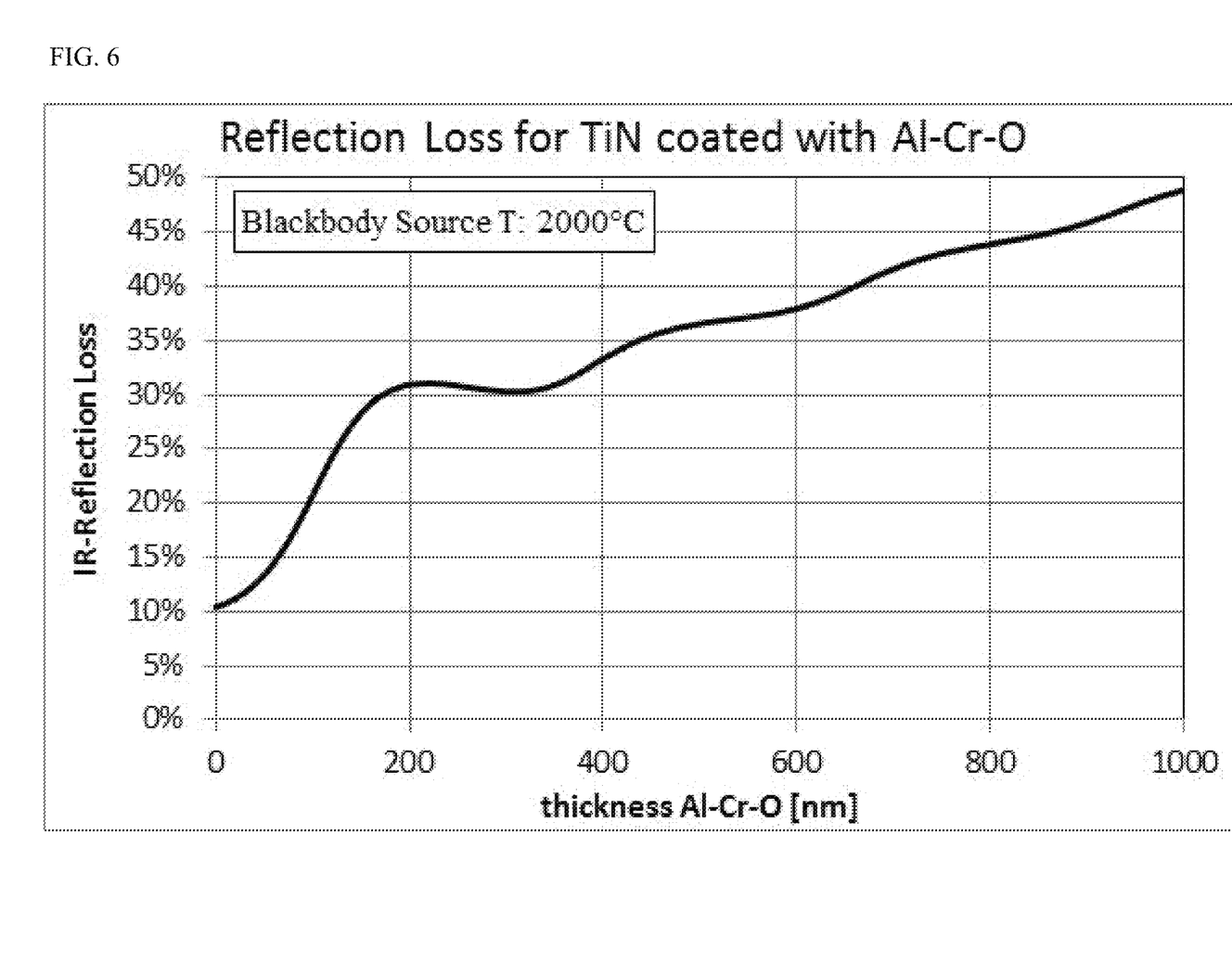
FIG. 6: Calculated IR radiation loss during reflection on a TiN layer coated with an Al—Cr—O layer, depending on the thickness of the Al—Cr—O layer, for a blackbody radiation source with T=2000° C.
Figure 7:
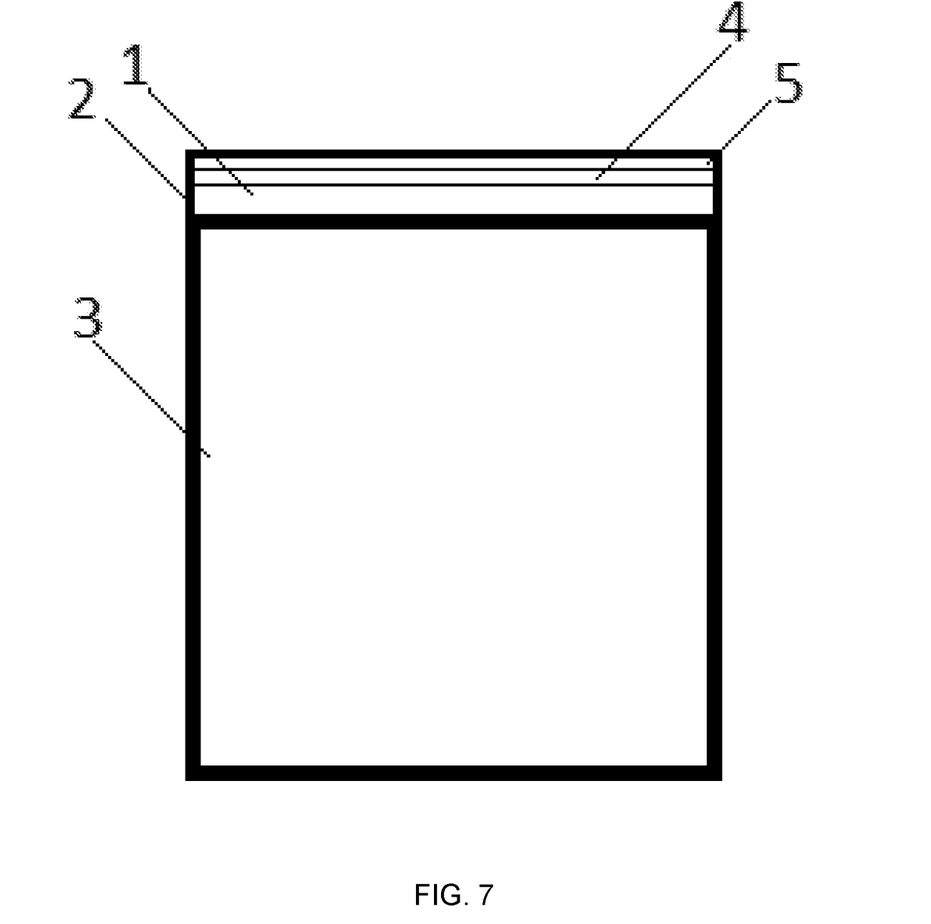
FIG. 7: Component (3) with an IR mirror (1) with a surface that is coated with a coating (2) comprising a TiN layer (4) and a temperature stable Al—Cr—O layer (5) applied on the TiN Layer (4).
Figure 8:
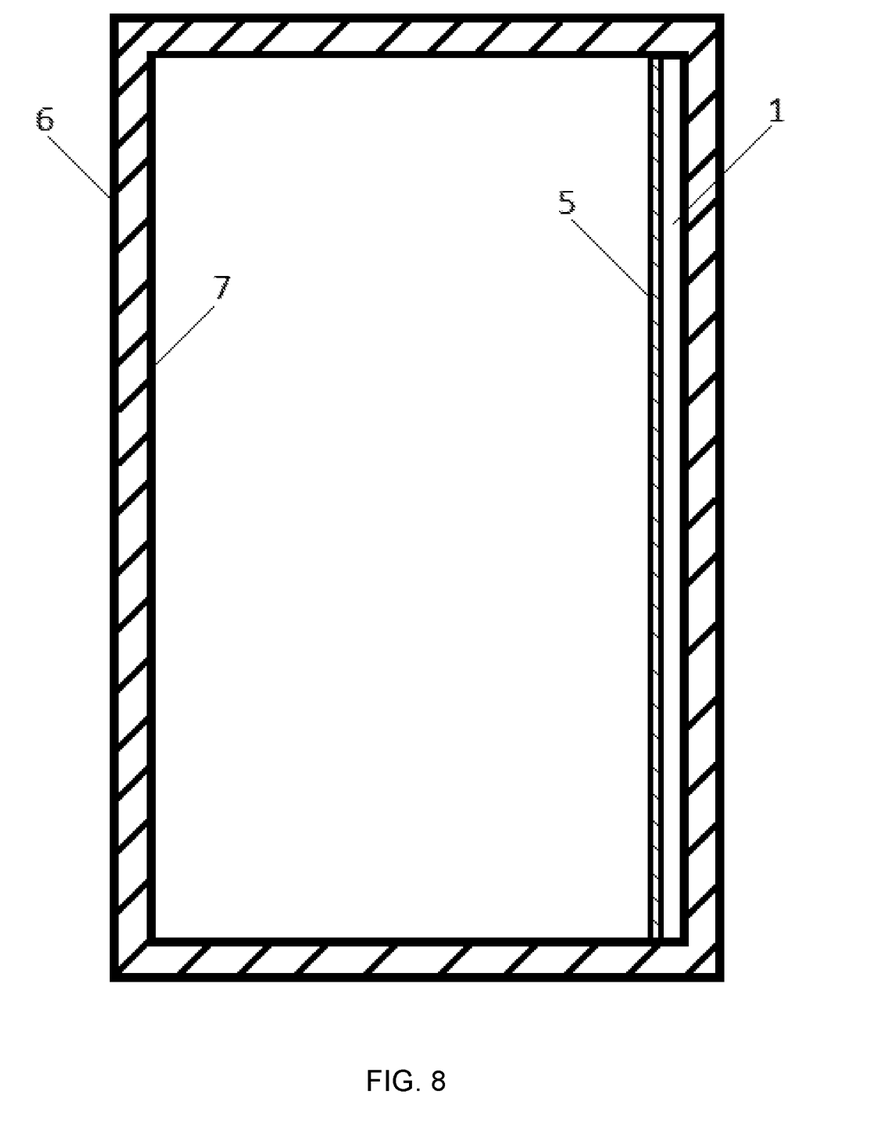
FIG. 8: A combustion chamber (6) comprising of an inner wall (7) with part of the inner wall surface being provided with an IR mirror (1) with a surface that is coated with a Al—Cr—O layer (5).

FIG. 6 shows the calculated relative IR reflection radiation loss of a blackbody source with a temperature of T=2000° C., whose emitted IR radiation is reflected onto a TiN layer coated with variable Al—Cr—O thickness. Starting from a loss of 10% (reflection of 90%) for a pure unprotected TiN, the reflection loss increases as the layer thickness of the covering Al—Cr—O layer increases. Following spectral interference pattern, the reflection loss does not increase continuously but first rises to a maximum and then falls slightly afterwards before increasing again with the layer thickness of the Al—Cr—O. With even higher quality stoichiometric Al—Cr—O layers, this minimum maximum pattern would be more pronounced. It is therefore advantageous to choose the layer thickness of the Al—Cr—O layer such that for the chosen thickness, the reflection loss can be kept as small as possible. According to the examples of FIGS. 5a and b, thicknesses in the range of 100 nm or 300 nm are advantageous. In contrast, a thickness in the range of 200 nm is less advantageous. As the layer thickness increases clearly beyond 500 nm (e.g. at least 10 or 20% more), such minima-maxima properties disappear due to the remaining optical absorption losses of the IR radiation in the Al—Cr—O layer. It is thus desirable to keep these absorption losses in the Al—Cr—O layer as low as possible by optimizing the composition.

Concretely, one can say the present invention shows that Al—Cr—O layers are eminently suitable for protecting layer systems and IR mirror surfaces and that these layers make it possible to produce layer systems and IR mirrors that have a high resistance at high temperatures and protect both other individual layers in the layer systems as well as surfaces from degradation of the optical properties both by oxidation and mechanical wear.

The present invention thus discloses an IR mirror with a surface that is coated with a single layer or with a multi-layer system, characterized in that the single layer or at least one of the layers in the multi-layer system consists of temperature-stable Al—Cr—O, wherein the Al—Cr—O layer has a layer thickness that is thinner than the typical wavelengths of the IR radiation, preferably has a layer thickness that is in a range of less than 1000 nm.

According to a preferred embodiment, the IR mirror is designed with a multi-layer system, wherein the multi-layer system comprises a layer of TiN and the at least one temperature-stable Al—Cr—O layer is applied on the TiN layer.

According to a further preferred embodiment, the IR mirror is designed such that the at least one temperature-stable Al—Cr—O layer is applied as the outmost cover layer.

According to a further preferred embodiment, the IR mirror is produced such that the concentration of aluminum in the temperature-stable Al—Cr—O layer is between 1 at % and 70 at %, when only the elements aluminum and chromium are taken into account for the calculation.

According to yet a further preferred embodiment, the IR mirror is produced such that the layer thickness of the temperature-stable Al—Cr—O layer is in the range of 100 nm to 1000 nm.

In this manner, the layer thickness is to be chosen for example such that for the specific application, the interference pattern characteristics remain in an acceptably low level and simultaneously a sufficient protection against oxidation is ensured. For example, the layer can, if necessary, depending on the application, be chosen such that it is not thicker than 500 nm or not thicker than 200 nm.

The present invention also discloses a method for producing an IR mirror according to one of the preceding embodiments, wherein the temperature-stable Al—Cr—O layer is deposited by means of reactive cathodic arc evaporation or by means of sputter coating methods onto the surface of the IR mirror.

The present invention also discloses the following uses of one or several IR mirrors according to one of the aforementioned embodiments:

a) Use in a combustion chamber, wherein at least part of an inner wall of the combustion chamber is provided with the IR mirror, in order to reduce or even completely prevent energy losses on the grounds of diffusion of the heat in the combustion chamber from inside to the outside.

b) Use in a combustion chamber, wherein at least part of an inner wall of the combustion chamber is provided with the IR mirror, in order to reduce the thermal load of the combustion chamber walls.

c) Use in a combustion chamber and/or in other components within the combustion chamber or outside of the combustion chamber, wherein at least part of an inner wall of the combustion chamber and/or at least part of a surface of the other components is provided with the IR mirror, in order to reduce the thermal load of the other component.

d) One of the three aforementioned uses a) to c), wherein the combustion chamber is a combustion chamber of a combustion engine.

e) One of the three aforementioned uses a) to c), wherein the combustion chamber is a combustion chamber of oil and gas combustion chambers for heating systems.

f) One of the three aforementioned uses a) to c), wherein the combustion chamber is a combustion chamber of a steam or gas turbine.

g) One of the three aforementioned uses a) to c), wherein the combustion chamber is a combustion chamber of a jet engine for rockets or aircraft.

h) Use in a reactor, which is used for the production of hydrogen by thermal dissociation of water vapor, wherein at least one part of an inner wall of the reactor is provided with the IR mirror.

i) Use in a reactor, which includes reactor surfaces in the field of nuclear fusion and nuclear fission, wherein at least one part of an inner wall of the reactor is provided with the IR mirror.

What is claimed is:

1. A component comprising:
an infrared (IR) mirror having a surface; and a coating on the surface comprising an oxide layer, and the oxide layer is a temperature-stable Al—Cr—O layer,
wherein the temperature-stable Al—Cr—O layer has a layer thickness that is thinner than typical wavelengths of the IR radiation, and a concentration of aluminum in the temperature-stable Al—Cr—O layer is between 1 at % and 70 at %, wherein the at % range is defined as an amount of aluminum as a percentage of a total amount of aluminum and chromium.

2. A component according to claim 1, wherein the coating is a multi-layer system comprising a layer of TiN, wherein the temperature-stable Al—Cr—O layer is applied on the TiN layer.

3. A component according to claim 1, wherein the temperature-stable Al—Cr—O layer is applied as an outmost cover layer of the coating.

4. A component according to claim 1, wherein the layer thickness of the temperature-stable Al—Cr—O layer is less than 1000 nm.

5. A component according to claim 4, wherein the coating is a multi-layer system comprising a layer of TiN, wherein the temperature-stable Al—Cr—O layer is applied on the TiN layer.

6. A component according to claim 5, further comprising a combustion chamber, wherein the IR mirror is provided on the combustion chamber.

7. A component according to claim 5, further comprising a reactor, wherein the IR mirror is provided on the reactor.

8. A method for producing a component according to claim 1, comprising the steps:
providing a component with a surface intended to comprise the IR mirror,
depositing the coating comprising the temperature-stable Al—Cr—O layer, wherein the temperature-stable Al—Cr—O layer is deposited by reactive cathodic arc evaporation or by a sputter coating method.

9. A component according to claim 1, further comprising a combustion chamber, wherein the IR mirror is provided on the combustion chamber.

10. A component according to claim 1, further comprising a reactor, wherein the IR mirror is provided on the reactor.

11. An apparatus comprising a combustion chamber, the combustion chamber having an inner wall, at least a part of the inner wall being provided with an infrared (IR) mirror having a surface; and a coating on the surface comprising an oxide layer, and the oxide layer is a temperature-stable Al—Cr—O layer,
wherein the temperature-stable Al—Cr—O layer has a layer thickness that is thinner than typical wavelengths of the IR radiation, and a concentration of aluminum in the temperature-stable Al—Cr—O layer is between 1 at % and 70 at %, wherein the at % range is defined as an amount of aluminum as a percentage of a total amount of aluminum and chromium.

* * * * *